3,028,235
COBALT BASE BRAZING ALLOY
George S. Hoppin III, Hamilton, Ohio, assignor to General Electric Company, a corporation of New York
No Drawing. Filed Dec. 29, 1958, Ser. No. 783,179
4 Claims. (Cl. 75—171)

This invention relates to cobalt base brazing alloys and, more particularly, to cobalt base brazing alloys including carbon, boron, silicon and tungsten.

One method for joining members of a structure is called "brazing" in which a metal or alloy called a "brazing alloy" flows between the members to be joined within a temperature range called "the brazing temperature." The members themselves are not melted as in welding but, after brazing, are held together by the brazing alloy at the brazed joint through a combination of adhesive forces and interdiffusion of the member material and the brazing alloy.

The quality and life of such a brazed joint is greatly increased when the metallurgical structure, properties and preferably the composition of the brazing alloy and the members being joined are more closely alike. Thus to join articles made from a cobalt base material, it is desirable to use a cobalt base brazing alloy rather than some other type such as a nickel base brazing alloy.

When such likeness exists, interdiffusion at the brazed joint creates a recrystallized joint with a grain structure which nearly matches that of the parent member material.

However, even when the members being joined and the brazing alloy have different bases so that close matching is not possible, it is always desirable that the brazing alloy have good flow characteristics during brazing and be nonerosive when used to join thin members, and that the brazed joint be strong yet ductile and resistant to oxidation at the intended service temperature.

It is one object of my invention to provide a cobalt base brazing alloy which will have good flow characteristics and oxidation resistance up to about 2000° F. service, which will be considerably less erosive than other available brazing alloys for work on thin sheet metal and which will result in a strong yet ductile joint.

Another object is to provide a cobalt base brazing alloy having good elevated temperature oxidation resistance for brazing members constructed from cobalt base alloys, thus to obtain matching of the material grain structure of the member and that of the brazed joint through recrystallization of the brazing alloy after brazing.

Briefly stated, in accordance with one aspect of my invention, I provide a cobalt base brazing alloy including in percent by weight up to about 0.5 carbon, at least about 0.5 boron, up to about 15 silicon and up to about 6 tungsten. In one form, I prefer the range in percent by weight of about 0.2–0.5 carbon, about 0.5–2.5 boron, about 5–15 silicon, about 2–6 tungsten, about 10–20 nickel, about 10–25 chromium with the balance essentially cobalt and having a maximum of about 5 percent by weight of other elements. I prefer to braze with my alloy in dry hydrogen within a temperature range of about 2150–2200° F.

I have found that the inclusion of carbon along with chromium and tungsten in my alloy is desirable to produce chromium and tungsten carbides which impart high strength to the alloy both at room and elevated temperature. Their precipitation after brazing prevents the high melting chromium and tungsten from raising the melting point of my alloy. I prefer the range of 0.2–0.5 percent by weight carbon in that much lower carbon will weaken my alloy and raise its melting point, much higher will result in embrittlement.

Boron in my alloy serves to lower the melting point and to promote good wetting and flow characteristics to the alloy. If boron is included at below about 0.5 percent by weight, the alloy melting point becomes excessive; if the boron content exceeds about 2.5 percent, the alloy becomes erosive to thin sheet metal and is embrittled.

Silicon is included at about 5–15 percent by weight to impart oxidation resistance and to help lower the alloy melting point. The inclusion of less than about 5 percent by weight impairs oxidation resistance and over about 15 percent by weight will embrittle my alloy.

Nickel and chromium in my alloy add strength and oxidation resistance.

*Example 1*

In an evaluation, I used my alloy in the form of about 200 mesh size powder in the preferred range in percent by weight of about 0.35–0.45 carbon, about 0.6–0.9 boron, about 7–9 silicon, about 3.5–4.5 tungsten, about 14–18 nickel, about 16–20 chromium with the balance essentially cobalt to join sheet metal articles fabricated from a molybdenum alloy comprising about ½ percent by weight titanium with the balance essentially molybdenum.

I first mixed my powdered alloy with a small amount of a binder of the acrylic resin type dissolved in toluene. After placing this putty-like mixture over the gap to be closed in the article, I placed the article, which in this case was a strut, in a furnace, the air atmosphere of which I then replaced with dry hydrogen. I raised the temperature of the furnace to about 2150–2200° F. at which temperature my brazing alloy melted and flowed readily into the gap to be closed thus forming a smooth brazed joint. Later testing proved this joint to be resistant to oxidation as well as strong yet ductile both at room temperature and up to about 2000° F.

*Example 2*

Another example of my alloy having the composition in percent by weight of about 0.4 carbon, about 0.75 boron, about 8.5 silicon, about 3.8 tungsten, about 16 nickel, about 18 chromium with the balance essentially cobalt was used as described above in Example 1 to join together thin cobalt base sheet material of about 0.005 inch thickness of the following nominal composition range:

| | Percent by weight |
|---|---|
| Carbon | 0.01 |
| Chromium | 20 |
| Nickel | 10 |
| Iron | 2.5 |
| Tungsten | 15 |
| Manganese | 1.5 |
| Cobalt | Balance |

Lap joints formed by brazing together other sheet material of the composition of Exampe 2 exhibited 50 percent higher room temperature strength than similar joints brazed with the best available nickel base brazing alloys. My alloy's unusual strength is attributed in part to the as-brazed micro-structure of fine hard particles such as tungsten and chromium carbides randomly dispersed in a ductile matrix. Such an arrangement is unachievable with other available elevated temperature brazing alloys which have heavily segregated continuous zones of brittle "eutective" alloy in their as-brazed microstructures. The room temperature strengths obtained on testing lap joints brazed with my alloy are only slightly lower than those obtained on similar joints brazed with completely ductile pure copper.

Although I have described my brazing alloy in connection with specific examples, these examples are to be construed as illustrative of rather than limitations on my alloy in its broad range. Those skilled in the art

What I claim is:

1. A cobalt base brazing alloy consisting essentially of in percent by weight about 0.2–0.5 carbon, about 0.5–2.5 boron, about 5–15 silicon, about 2–6 tungsten, about 10–20 nickel, about 10–25 chromium with the balance cobalt.

2. A cobalt base brazing alloy consisting essentially of in percent by weight about 0.35–0.45 carbon, about 0.6–0.9 boron, about 7–9 silicon, about 3.5–4.5 tungsten, about 14–18 nickel, about 16–20 chromium, with the balance cobalt.

3. The alloy of claim 3 containing in percent by weight a maximum of 0.03 sulphur, 0.03 phosphorus.

4. A cobalt base brazing alloy consisting essentially of in percent by weight about 0.4 carbon, about 0.75 boron, about 8.5 silicon, about 3.8 tungsten, about 16 nickel, about 18 chromium with the balance cobalt.

References Cited in the file of this patent

UNITED STATES PATENTS 1,203,555     Brix  ---------------- Oct. 31, 1916